US011200296B2

(12) United States Patent
Petrovicky et al.

(10) Patent No.: US 11,200,296 B2
(45) Date of Patent: Dec. 14, 2021

(54) LIMITED DURATION SUPPLY FOR HEURISTIC ALGORITHMS

(71) Applicant: Red Hat, Inc., Raleigh, NC (US)

(72) Inventors: Lukas Petrovicky, Raleigh, NC (US); Geoffrey De Smet, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1091 days.

(21) Appl. No.: 15/789,557

(22) Filed: Oct. 20, 2017

(65) Prior Publication Data

US 2019/0121835 A1    Apr. 25, 2019

(51) Int. Cl.
*G06N 5/00*  (2006.01)
*G06F 17/12*  (2006.01)
*G06F 8/20*  (2018.01)

(52) U.S. Cl.
CPC ............. *G06F 17/12* (2013.01); *G06F 8/22* (2013.01); *G06N 5/003* (2013.01); *G06N 5/006* (2013.01)

(58) Field of Classification Search
CPC ..................................... G06F 8/22; G06F 9/06
See application file for complete search history.

(56) References Cited

U.S. PATENT DOCUMENTS

| | | | |
|---|---|---|---|
| 7,194,002 B2 | 3/2007 | Zhang et al. | |
| 7,627,537 B2 | 12/2009 | Lai | |
| 7,636,918 B2 * | 12/2009 | Kadashevich | ...... G06F 11/3466 709/223 |
| 7,734,365 B2 | 6/2010 | Degbotse et al. | |
| 8,332,348 B1 | 12/2012 | Avery | |
| 8,655,705 B2 | 2/2014 | Riepshoff et al. | |
| 9,450,605 B2 | 9/2016 | Faerber et al. | |
| 2006/0230404 A1* | 10/2006 | Sato | ................. G06Q 10/06316 718/102 |
| 2007/0060258 A1* | 3/2007 | Duhamel | ................ G07F 17/32 463/16 |
| 2009/0204663 A1* | 8/2009 | Patwari | .............. H04N 21/4728 709/203 |
| 2010/0017352 A1* | 1/2010 | Maturana | ................. G06N 5/02 706/46 |

(Continued)

FOREIGN PATENT DOCUMENTS

TW      201140469 A    11/2011

OTHER PUBLICATIONS

Guestrin, Carlow, "Distributed Planning in Hierarchical Factored MDPs," Eighteenth Conference on Uncertainty in Artificial Intelligence, Aug. 1-4, 2002, Edmonton, Canada, Morgan Kaufmann Publishers Inc., 10 pages.

(Continued)

*Primary Examiner* — Hal Schnee
(74) *Attorney, Agent, or Firm* — Withrow & Terranova, PLLC (57) ABSTRACT

Limited duration supply for heuristic algorithms is disclosed. A supply manager receives, from a first subsystem, a first request for a first supply. The supply manager determines that the first supply is not executing. The supply manager initiates the first supply, the first supply to return supply data upon request. The supply manager provides to the first subsystem a supply reference that refers to the first supply that allows the first subsystem to request the supply data directly from the first supply. The supply manager subsequently determines that no subsystem requires the first supply and disables the first supply.

19 Claims, 6 Drawing Sheets

(56) References Cited

U.S. PATENT DOCUMENTS

| | | | | |
|---|---|---|---|---|
| 2012/0102185 A1* | 4/2012 | Fernandes | ............... | H04L 67/38 |
| | | | | 709/224 |
| 2013/0120402 A1* | 5/2013 | Adams | ..................... | G06F 8/38 |
| | | | | 345/473 |
| 2015/0264122 A1* | 9/2015 | Shau | .................... | G06F 9/5088 |
| | | | | 709/203 |

OTHER PUBLICATIONS

Novotná, Kateřina, "Heuristic Solving of Planning Problems," Master Thesis, 2013, Brno University of Technology, 53 pages.

Tang, Lingjia et al., "The Impact of Memory Subsystem Resource Sharing on Datacenter Applications," 38th Annual International Symposium on Computer Architecture (ISCA), Jun. 4-8, 2011, San Jose, California, USA, ACM, 12 pages.

Zhang, Ning et al, "Towards Cost-Effective Storage Provisioning for DBMSs," 38th International Conference on Very Large Data Bases, vol. 5, Issue 4, Aug. 27-31, 2012, Istanbul, Turkey, VLDB Endowment, pp. 274-285.

\* cited by examiner

LIMITED DURATION SUPPLY FOR HEURISTIC ALGORITHMS

TECHNICAL FIELD

The examples relate to heuristic and metaheuristic algorithms, and in particular to a limited duration supply for heuristic and metaheuristic algorithms.

BACKGROUND

A constraint satisfaction solver uses heuristics and metaheuristics to identify a sufficiently good solution to an optimization problem.

SUMMARY

The examples implement a limited duration supply for heuristic and metaheuristic algorithms. In particular, the examples limit the processing of a supply to only those times during a constraint satisfaction solver that the supply would be needed.

In one example a method is provided. The method includes receiving, by a supply manager executing on a processor device, from a first subsystem, a first request for a first supply. The method further includes determining, by the supply manager, that the first supply is not executing. The method further includes initiating the first supply, the first supply to return supply data upon request. The method further includes providing to the first subsystem a supply reference that refers to the first supply that allows the first subsystem to request the supply data directly from the first supply. The method further includes subsequently determining, by the supply manager, that no subsystem requires the first supply, and disabling the first supply.

In another example a computing device is provided. The computing device includes a memory, and a processor device coupled to the memory. The processor device is to receive, from a first subsystem, a first request for a first supply. The processor device is further to determine that the first supply is not executing. The processor device is further to initiate the first supply, the first supply to return supply data upon request. The processor device is further to provide to the first subsystem a supply reference that refers to the first supply that allows the first subsystem to request the supply data directly from the first supply. The processor device is further to subsequently determine that no subsystem requires the first supply, and to disable the first supply.

In another example a computer program product is provided. The computer program product is stored on a non-transitory computer-readable storage medium and includes instructions to cause a processor device to receive, from a first subsystem, a first request for a first supply. The instructions further cause the processor device to determine that the first supply is not executing. The instructions further cause the processor device to initiate the first supply, the first supply to return supply data upon request. The instructions further cause the processor device to provide to the first subsystem a supply reference that refers to the first supply that allows the first subsystem to request the supply data directly from the first supply. The instructions further cause the processor device to subsequently determine that no subsystem requires the first supply, and to disable the first supply.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first request" and "second request," and does not imply a priority, a type, an importance, or other attribute, unless otherwise stated herein. As used herein and in the claims, the articles "a" and "an" in reference to an element refers to "one or more" of the element unless otherwise explicitly specified.

A constraint satisfaction solver (CSS) utilizes optimization algorithms, such as, by way of non-limiting example, heuristics and metaheuristics, on a model of a constraint-based problem to identify a "best" solution to the problem. The best solution state may be qualified in terms of processing time or other limitations. Based on the number of potential objects and variables in the particular model, millions of different solutions may be generated and scored, and thus constraint satisfaction solving can be extremely processor-intensive and time-consuming.

In some CSSs, a supply is a process that continuously executes in conjunction with a solver that may score millions of different solutions until a final solution is selected. In response to changes in the solution state, a supply keeps track of a supply data, and can supply the supply data upon request without delay because the supply has determined the supply data in advance of the request. A supply registers to be notified when certain events occur during the life of the solver. The event may be any one or more of a number of different events that occur during the life of the solver, such as a step started event, a step ended event, a phase started event, a phase ended event, a move selection event, a move evaluation event, or the like. Upon notification of the occurrence of an event to which the supply is registered, the supply performs certain processing, such as, by way of non-limiting example, determining a solution score of a current solution state, determining whether certain constraints are met, determining periods of time, and the like, and generates supply data. The supply data may be determined based on incremental changes, sometimes referred to as delta calculations, in a state of a solution from one solution state to another solution state. This processing is performed whether or not the supply will actually be called subsequently to provide the supply data.

There can be a number of different supplies that each performs processing upon the occurrence of certain events. However, there are periods of time during the life of the solver during which particular supplies will not be called to return the supply data because the supply data is not relevant during such periods of time. Unfortunately, even during those periods of time the supplies are utilizing limited processing cycles and memory, reducing the processing cycles and memory available for the solver.

The examples implement a limited duration supply for heuristic and metaheuristic algorithms, such as a CSS. In particular, the examples limit the processing of a supply to only those periods of time during the life of a solver that the supply will be needed, thereby eliminating the use of processing cycles and memory by a supply that will not be used.

Figure 1:
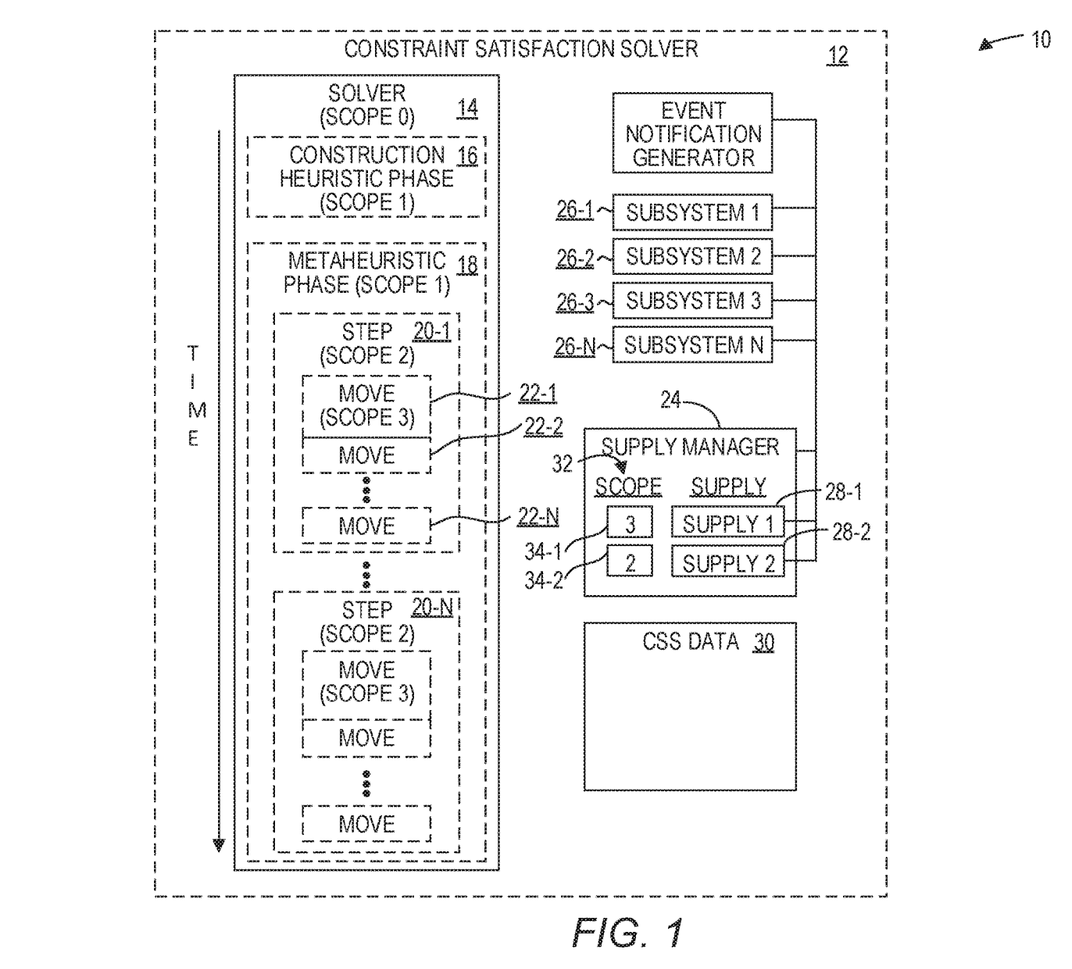
FIG. 1 is a block diagram of a constraint satisfaction solver (CSS) that implements a limited duration supply for a heuristic algorithm, according to one example.

FIG. 1 is a block diagram of a CSS 10 according to one example. The CSS 10 includes a solver 12, which, for example, may be a separate thread of the CSS 10. The solver 12 executes in a staged manner. In this example, the solver 12 includes a solver stage 14, which is an outer stage of the CSS 10, and manages the overall execution of the CSS 10. An initial construction heuristic phase stage 16 determines an initial solution state. The initial construction heuristic phase stage 16 is a nested stage. Thus, the initial construction heuristic phase stage 16 executes during the solver stage 14. The construction heuristic phase stage 16 may use any desired algorithm to determine the initial solution state, such as a first fit algorithm, first fit decreasing algorithm, best fit, or the like.

After the construction heuristic phase stage 16, a nested metaheuristic phase stage 18 begins. The metaheuristic phase stage 18 may be, for example, a local search stage, such as a tabu search stage, a simulated annealing stage, a late acceptance stage, a genetic algorithm stage, or the like. The metaheuristic phase stage 18 in this example is a local search stage, and includes a plurality of nested step stages 20-1-20-N. Each step stage 20-1 determines a next solution state based on a plurality of nested move stages 22-1-22-N. The move stages 22-1-22-N involve testing and scoring various different moves. The move that scores the best will become the next solution state.

Each stage has a scope identifier associated with the level of nesting of the respective stage. The solver stage 14 has a scope ID of 0. The construction heuristic phase stage 16 has a scope ID of 1. The metaheuristic phase stage 18 has a scope ID of 1. Each step stage 20 has a scope ID of 2.

Each move stage 22 has a scope ID of 3. As used herein, lower scope IDs will be referred to as "wider" than a higher scope ID. For example, a scope ID of 2 is wider than a scope ID of 3. A scope ID of 3 is "narrower" than a scope ID of 2.

The metaheuristic phase stage 18 initiates a supply manager 24 and one or more subsystems 26-1-26-N (generally, subsystems 26). Each subsystem 26 is designed to perform a particular function associated with the CSS 10. While a subsystem 26 may perform any function, examples of functions of subsystems 26 include score calculation of a solution state, or neighborhood generation (sometimes referred to as a move selector). A subsystem 26 is called by the solver 12 to perform a particular function that may be performed repeatedly. A subsystem 26 may also subscribe or register for particular events that are generated during the execution of the CSS 10.

Merely as an example, in the well-known four queens constraint problem, wherein the constraint problem is how four queens can be placed on a 4×4 chess board such that no queen can attack any other queen, a subsystem may be used to select a particular queen of the four queens that should be the subject of a move. As will be discussed below, in such an example, the subsystem may use a supply that keeps track of the number of constraints each queen matches, e.g., the number of other queens each queen can attack. The subsystem may request the list of queens and corresponding constraints and, for example, select the queen with the most constraints for the move.

A subsystem 26 may utilize one or more supplies 28-1, 28-2 (generally, supplies 28). A supply 28 is designed to return supply data based on a current state (i.e., a working solution state) of the CSS 10. Examples of supply data include the remaining time of a timer, score calculation, a query to find all variables that match a specific constraint, and the like. Typically a supply 28, in response to changes to the solution state, keeps track of a particular supply data, and can supply the supply data upon request without delay because the supply has determined the supply data in advance of the request.

One example of supply data was provided above, wherein, in response to a move of a queen in the four queens constraint problem, a supply automatically updates a list that keeps track of each queen and the number of constraints that each queen matches. In some examples, the supply 28 may maintain track of this list via delta changes (i.e., incremental changes) from one solution state to another solution state such that only the queens affected by a move are updated, rather than recalculating the number of constraints for each queen. Normal, everyday constraint-based problems may involve hundreds or thousands of different variables, and using delta changes to maintain the supply data instead of completely recalculating the information for each variable after each move saves substantial processing, and ensures that a supply 28 has the correct supply data upon request from a subsystem 26, and that the subsystem 26 need not wait for the supply data while the supply 28 recalculates the supply data for each variable.

Another example of a supply 28, in the context of the four queens problem discussed above, is a supply that maintains track of all queens on a particular row.

In a constraint-based problem involving scheduling workers, such as determining a schedule for nurses for various shifts in a hospital, a supply 28 may keep track of the shifts per employee. Another supply 28 may keep track of the shifts for each employee of a particular department, such as the shifts for nurses of the pediatric department. In summary, a supply 28, upon a change in state of the solution state, automatically updates the supply data that the supply 28 has been designed to track, and can supply the supply data to a subsystem 26 upon request.

Each supply 28 registers for notifications of events that occur during the life of the solver stage 14. The events may comprise, by way of non-limiting example, a step started event, a step ended event, a phase started event, a phase ended event, a move selection event, a move evaluation event, or the like. Upon the occurrence of an event to which the supply 28 is registered, the supply 28 may access CSS data 30 and perform certain processing, such as, by way of non-limiting example, determining a score of a current solution state, determining whether certain constraints are met, determining periods of time, and the like.

When a subsystem 26 needs a supply 28, the subsystem 26 initiates a request to the supply manager 24. The supply manager 24 determines if the requested supply 28 already exists. If so, the supply manager 24 sends the subsystem 26 a reference (such as a pointer) to the supply 28, to enable the subsystem 26 to call the supply 28 as desired. Thus, the embodiments eliminate the need to initiate multiple supplies 28 that are determining the same supply data, eliminating the use of processing cycles that can now be used, for example, by the solver 12 or a subsystem 26.

If the supply 28 does not already exist, the supply manager 24 initiates the supply 28, obtains or generates a reference to the supply 28, and sends the reference to the subsystem 26 to enable the subsystem 26 to call the supply 28 as desired. The subsystems 26 invoke a particular supply 28 to obtain the supply data determined by the particular supply 28.

The supply manager 24 maintains supply utilization information 32 about the subsystems 26 that use the supplies 28. In one example, the supply utilization information 32 is a scope identifier (ID) 34-1, 34-2 that is associated with each supply 28. When a supply 28 is initially initiated, the scope ID of the supply 28 is set to that of the scope ID provided by the subsystem 26 that requested the supply 28. For example, if a particular subsystem 26 requests the supply 28-1 during the move stage 22-1, the subsystem 26 identifies the scope ID as 3.

When a stage ends, the supply manager 24 receives an event corresponding to the change in scope, and determines that the subsystem 26 no longer needs the supply 28. The supply manager 24 then disables the supply 28 to halt further processing by the supply 28. The supply manager 24 may send the supply 28 a message to halt processing, or may terminate the supply 28.

Figure 2:
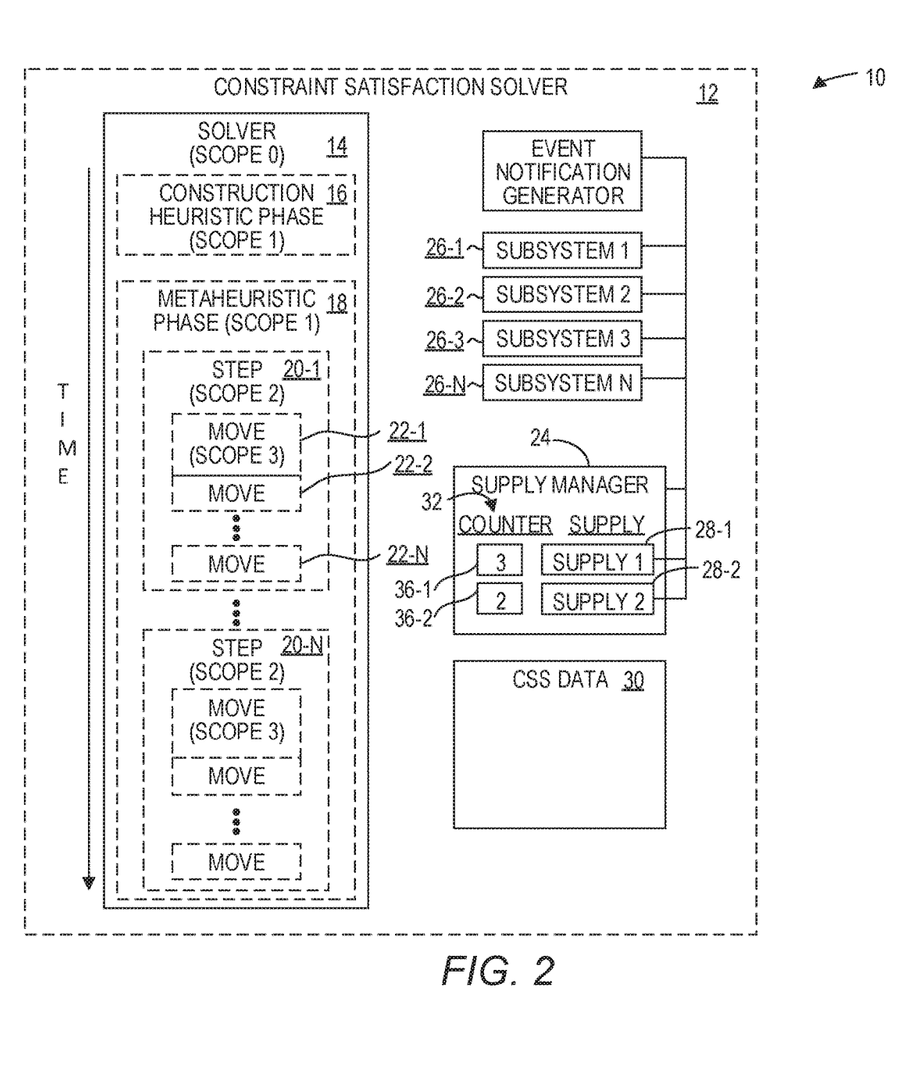
FIG. 2 is a block diagram of the CSS illustrated in FIG. 1 according to another example.

FIG. 2 is a block diagram of the CSS 10 according to another example. In this example, the supply manager 24 keeps track of the number of subsystems 26 that use a particular supply 28. In particular, the supply manager 24 maintains supply utilization information 32 that includes supply counters 36-1, 36-2 and that maintains a count of each subsystem 26 that is using a supply 28. For example, assume that the subsystem 26-1 initially requests the supply 28-1 from the supply manager 24. The supply manager 24 determines that the requested supply 28-1 is not initiated, and initiates the supply 28-1. The supply manager 24 increments the supply counter 36-1 to a value of one and returns to the subsystem 26-1 a reference to the supply 28-1. The subsystem 26-2 requests the supply 28-1. The supply manager 24 determines that the supply 28-1 is executing, and increments the supply counter 36-1 to a value of two. The supply manager 24 returns to the subsystem 26-2 a reference to the supply 28-1.

Assume further that the subsystem 26-2 informs the supply manager 24 that the supply 28-1 is no longer needed by the subsystem 26-2. The supply manager 24 decrements the supply counter 36-1, resulting in the supply counter 36-1 having a value of one. Subsequently, the subsystem 26-1 informs the supply manager 24 that the supply 28-1 is no longer needed by the subsystem 26-1. The supply manager 24 decrements the supply counter 36-1, resulting in the supply counter 36-1 having a value of zero. In response to the supply counter 36-1 having a value of zero, the supply manager 24 disables the supply 28-1. Assume that the subsystem 26-1 subsequently again requires the supply 28-1. The subsystem 26-1 requests the supply 28-1 from the supply manager 24. The supply manager 24 determines that the requested supply 28-1 is not initiated, and initiates the supply 28-1. The supply manager 24 increments the supply counter 36-1 to a value of one, and returns to the subsystem 26-1 a reference to the supply 28-1.

Figure 3:
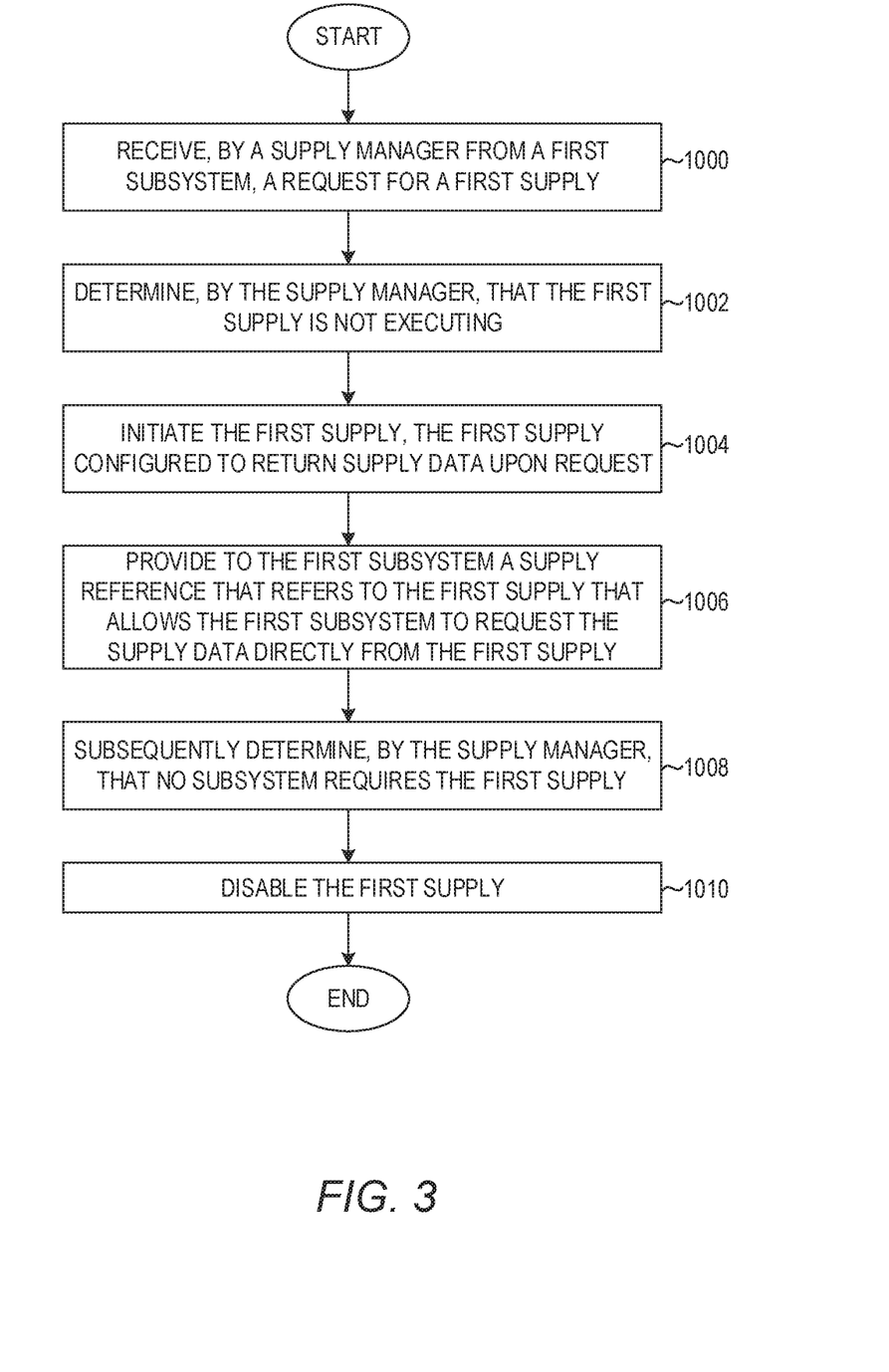
FIG. 3 is a flowchart of a method for implementing a limited duration supply for a heuristic algorithm according to one example.

FIG. 3 is a flowchart of a method for implementing a limited duration supply for a heuristic algorithm according to one example. FIG. 3 will be discussed in conjunction with FIGS. 1 and 2. The supply manager 24 receives a first request for a first supply 28-1 from the subsystem 26-1 (FIG. 3, block 1000). The supply manager 24 determines that the first supply 28-1 is not executing (FIG. 3, block 1002). The supply manager 24 initiates the first supply 28-1. The first supply 28-1 is configured to return supply data upon request (FIG. 3, block 1004). The supply manager 24 provides to the subsystem 26-1 a supply reference that refers to the first supply 28-1 that allows the subsystem 26-1 to request the supply data directly from the first supply 28-1 (FIG. 3, block 1006). The supply manager 24 subsequently determines that no subsystem 26 requires the first supply 28-1 (FIG. 3, block 1008). As discussed above, this may be determined, for example, via the use of scope IDs, via supply counters, or via other mechanisms. The supply manager 24 disables the first supply 28-1 (FIG. 3, block 1010).

Figure 4:
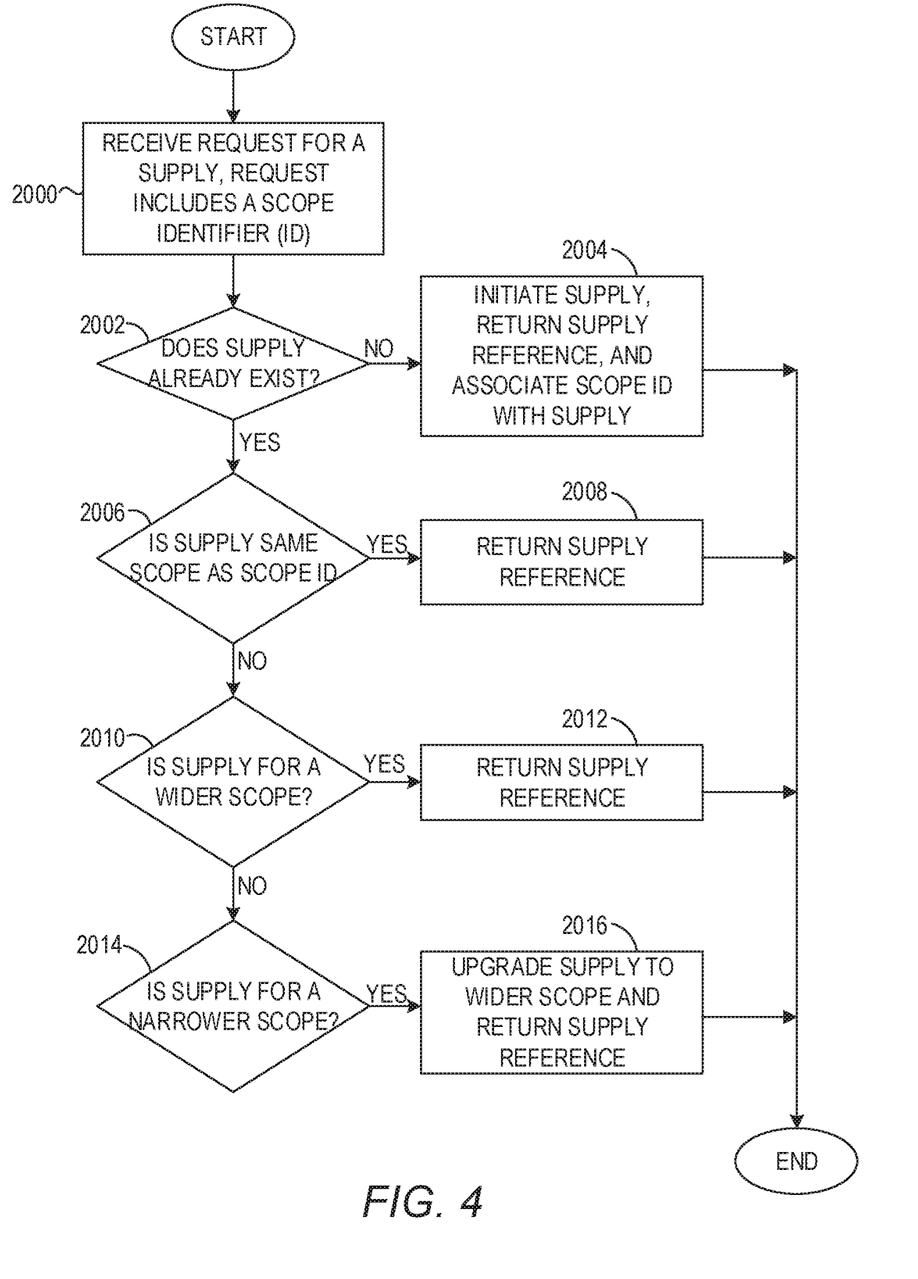
FIG. 4 is a flowchart of a method for managing a scope identifier that is associated with a supply according to one example.

FIG. 4 is a flowchart of a method for managing a scope ID 34 that is associated with a supply 28 according to one example. Assume that the subsystem 26-1 requests the supply 28-1 from the supply manager 24 (FIG. 4, block 2000). The request includes a scope ID associated with the stage for which the subsystem 26-1 needs the supply 28-1. The supply manager 24 first determines whether the supply 28-1 exists (FIG. 4, block 2002). If not, the supply manager 24 initiates the supply 28-1, returns a reference to the supply 28-1 to the subsystem 26-1, and associates the scope ID that was included in the request with the supply 28-1 (FIG. 4, block 2004).

If at block 2002 the supply 28-1 already exists, the supply manager 24 determines if the associated scope ID 34 of the supply 28-1 is the same scope as the scope ID included in the request from the subsystem 26-1 for the supply 28-1 (FIG. 4, block 2006). If the associated scope ID 34 of the supply 28-1 is the same scope as the scope ID included in the request from the subsystem 26-1, the supply manager 24 returns to the subsystem 26-1 a reference to the supply 28-1 (FIG. 4, block 2008).

If at block 2006 the supply manager 24 determines that the associated scope ID 34 of the supply 28-1 is not the same scope as the scope ID included in the request from the subsystem 26-1, the supply manager 24 determines if the scope ID 34 associated with the supply 28-1 is a wider scope than the scope ID included in the request from the subsystem 26-1 (FIG. 4, block 2010). If so, the supply manager 24 returns to the subsystem 26-1 a reference to the supply 28-1 (FIG. 4, block 2012).

If at block 2010 the supply manager 24 determines that the scope ID 34 associated with the supply 28-1 is not a wider scope than the scope ID included in the request from the subsystem 26-1, the supply manager 24 determines if the scope ID 34 associated with the supply 28-1 is a narrower scope than the scope ID included in the request from the subsystem 26-1 (FIG. 4, block 2014). If so, the supply manager 24 sets the scope ID 34 to be at the wider scope of the scope ID included in the request from the subsystem 26-1, and returns to the subsystem 26-1 a reference to the supply 28-1 (FIG. 4, block 2016).

Figure 5:
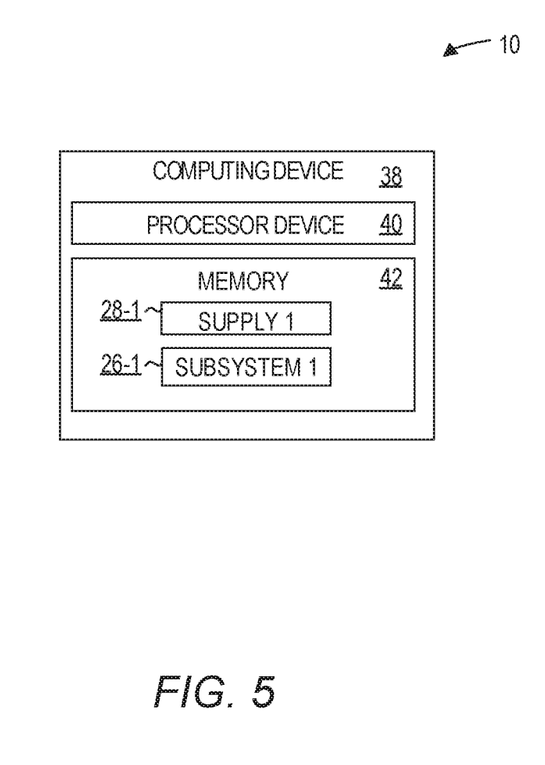
FIG. 5 is a block diagram of the CSS according to another example.

FIG. 5 is a block diagram of the CSS 10 according to another example. The CSS 10 executes in conjunction with a computing device 38. The computing device 38 includes a processor device 40 and a memory 42 that is coupled to the memory 42. Because the supply manager 24 is a component of the computing device 38, functionality implemented by the supply manager 24 may be attributed to the computing device 38 generally. Moreover, in examples where the supply manager 24 comprises software instructions that program the processor device 40 to carry out functionality discussed herein, functionality implemented by the supply manager 24 may be attributed herein to the processor device 40.

The processor device 40 is to receive, from the first subsystem 26-1, a first request for the supply 28-1. The processor device 40 is further to determine that the supply 28-1 is not executing. The processor device 40 initiates the supply 28-1. The supply 28-1 is configured to return supply data upon request. The processor device 40 provides to the first subsystem 26-1 a supply reference that refers to the supply 28-1 that allows the first subsystem 26-1 to request the supply data directly from the supply 28-1. The processor device 40 subsequently determines that no subsystem 26 requires the supply 28-1, and disables the supply 28-1.

Figure 6:
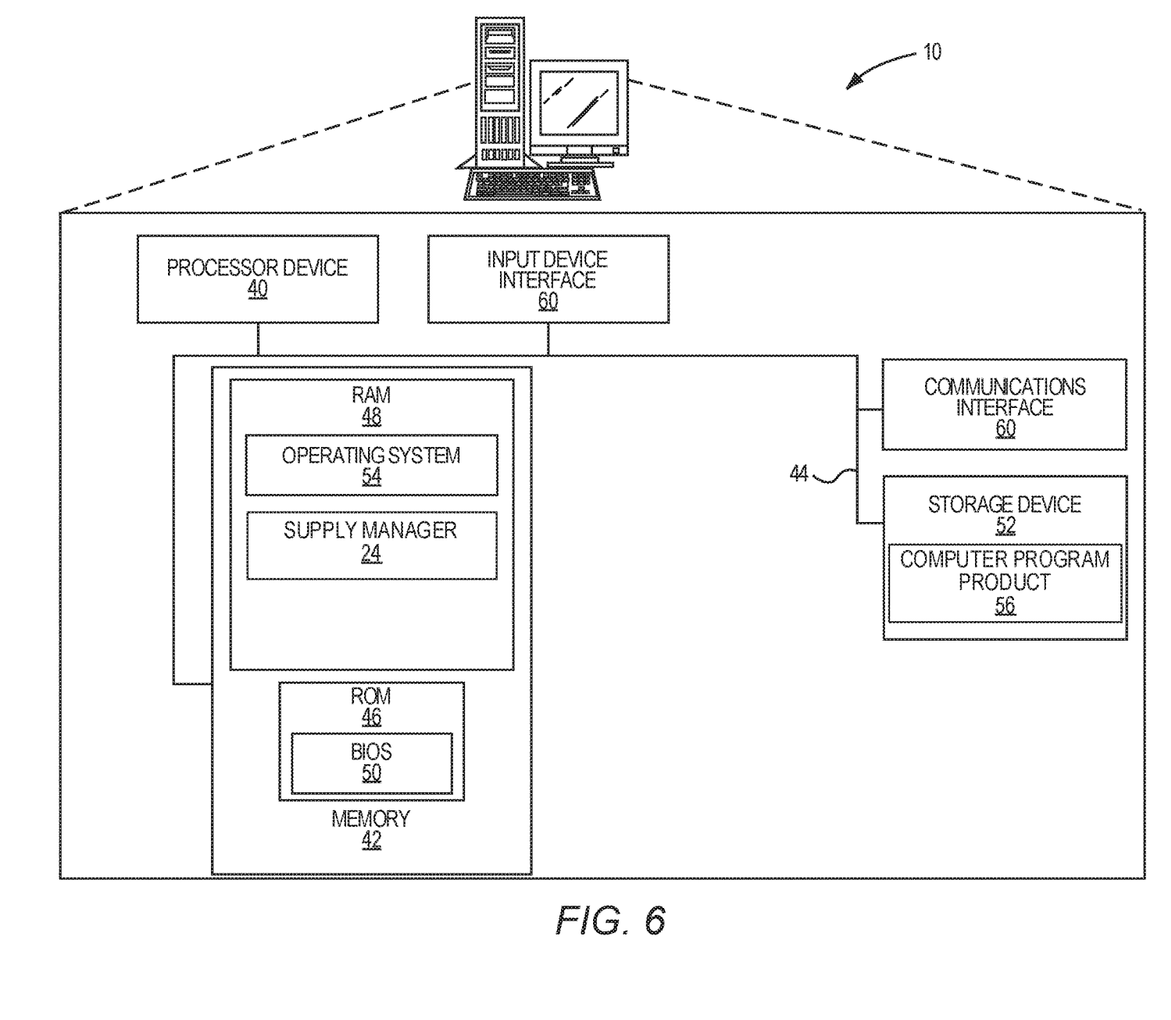
FIG. 6 is a block diagram of a computing device suitable for implementing examples disclosed herein.

FIG. 6 is a block diagram of the computing device 38 suitable for implementing examples disclosed herein. The computing device 38 may comprise any computing or electronic device capable of including firmware, hardware, and/or executing software instructions to implement the functionality described herein, such as a computer server, a desktop computing device, a laptop computing device, or the like. The computing device 38 includes the processor device 40, the system memory 42, and a system bus 44. The system bus 44 provides an interface for system components including, but not limited to, the system memory 42 and the processor device 40. The processor device 40 can be any commercially available or proprietary processor.

The system bus 44 may be any of several types of bus structures that may further interconnect to a memory bus (with or without a memory controller), a peripheral bus, and/or a local bus using any of a variety of commercially available bus architectures. The system memory 42 may include non-volatile memory 46 (e.g., read-only memory (ROM), erasable programmable read-only memory (EPROM), electrically erasable programmable read-only memory (EEPROM), etc.), and volatile memory 48 (e.g., random-access memory (RAM)). A basic input/output system (BIOS) 50 may be stored in the non-volatile memory 46 and can include the basic routines that help to transfer information between elements within the computing device 38. The volatile memory 48 may also include a high-speed RAM, such as static RAM, for caching data.

The computing device 38 may further include or be coupled to a non-transitory computer-readable storage medium such as a storage device 52, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 52 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 52 and in the volatile memory 48, including, by way of non-limiting example, the supply manager 24 and an operating system 54. All or a portion of the examples may be implemented as a computer program product 56 stored on a transitory or non-transitory computer-usable or computer-readable storage medium, such as the storage device 52, which includes complex programming instructions, such as complex computer-readable program code, to cause the processor device 40 to carry out the steps described herein. Thus, the computer-readable program code can comprise software instructions for implementing the functionality of the examples described herein when executed on the processor device 40. The processor device 40, in conjunction with the supply manager 24 in the volatile memory 48, may serve as a controller, or control system, for the computing device 38 that is to implement the functionality described herein.

An operator may also be able to enter one or more configuration commands through a keyboard (not illustrated) or a pointing device such as a mouse (not illustrated). Such input devices may be connected to the processor device 40 through an input device interface 58 that is coupled to the system bus 44 but can be connected by other interfaces such as a parallel port, an Institute of Electrical and Electronic Engineers (IEEE) 1394 serial port, a Universal Serial Bus (USB) port, an IR interface, and the like.

The computing device 38 may also include a communications interface 60 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a supply manager executing on a processor device, from a first subsystem, a first request for a first supply, wherein the first supply tracks supply data based on changes in a recommended solution state determined by a constraint satisfaction solver using the supply data;
   determining, by the supply manager, that the first supply is not executing;
   initiating the first supply, the first supply to return supply data upon request;
   providing to the first subsystem a supply reference that refers to the first supply that allows the first subsystem to request the supply data directly from the first supply;
   subsequently determining, by the supply manager, that no subsystem requires the first supply; and
   disabling the first supply.

2. The method of claim 1 wherein the first subsystem implements a function to facilitate the determination by the constraint satisfaction solver of the recommended solution state from a plurality of solution states of a constraint problem, the constraint satisfaction solver executing in a plurality of stages, and wherein the constraint satisfaction solver continues to execute after the disabling of the first supply.

3. The method of claim 2 wherein the first request for the first supply includes a scope identifier that identifies a particular scope associated with a stage during which the first supply is needed, and wherein subsequently determining that no subsystem requires the first supply comprises subsequently determining, by the supply manager, that the constraint satisfaction solver has moved to a stage that has a scope that is different from the particular scope.

4. The method of claim 1 further comprising:
in response to receiving the first request for the first supply, incrementing a first supply counter;
subsequently receiving, from the first subsystem, an indication that the first subsystem no longer needs the first supply;
decrementing the first supply counter; and
wherein subsequently determining, by the supply manager, that no subsystem requires the first supply comprises determining, by the supply manager, that the first supply counter indicates that no subsystem is using the first supply.

5. The method of claim 1 further comprising:
receiving, from the first subsystem, an indication that the first subsystem no longer needs a second supply;
decrementing a second supply counter;
determining, by the supply manager, that the second supply counter indicates that another subsystem is continuing to use the second supply; and
not disabling the second supply to allow the second supply to continue to operate.

6. The method of claim 1 further comprising:
receiving, by the supply manager, from a second subsystem a request for a second supply that is different from the first supply, the request including a scope identifier that identifies a scope of a stage during which the second subsystem needs the second supply;
determining that the second supply exists;
determining that the second supply has an associated scope that is narrower than the scope of the stage during which the second subsystem needs the second supply;
setting the associated scope of the second supply to the scope of the stage during which the second subsystem needs the second supply; and
providing to the second subsystem a supply reference that refers to the second supply that allows the second subsystem to request data directly from the second supply.

7. The method of claim 1 further comprising:
receiving, by the supply manager, from a second subsystem a request for a second supply that is different from the first supply, the request including a scope identifier that identifies a scope of a stage during which the second subsystem needs the second supply;
determining that the second supply exists;
determining that the second supply has an associated scope that is wider than the scope of the stage during which the second subsystem needs the second supply; and
providing to the second subsystem a supply reference that refers to the second supply that allows the second subsystem to request data directly from the second supply.

8. The method of claim 1 further comprising:
receiving, by the supply manager, from the first subsystem, a request for a second supply that is different from the first supply;
determining, by the supply manager, that the second supply is not executing;
initiating the second supply; and
providing to the first subsystem a supply reference that refers to the second supply that allows the first subsystem to request the supply data directly from the second supply.

9. A computing device, comprising:
a memory;
a processor device coupled to the memory to:
receive, from a first subsystem, a first request for a first supply, wherein the first subsystem implements a function to facilitate a determination by a constraint satisfaction solver of a recommended solution state from a plurality of solution states of a constraint problem;
determine that the first supply is not executing;
initiate the first supply, the first supply to return supply data upon request;
provide to the first subsystem a supply reference that refers to the first supply that allows the first subsystem to request the supply data directly from the first supply;
subsequently, determine that no subsystem requires the first supply; and
disable the first supply.

10. The computing device of claim 9 the constraint satisfaction solver executing in a plurality of stages, and wherein the constraint satisfaction solver continues to execute after the disabling of the first supply.

11. The computing device of claim 10 wherein the first request for the first supply includes a scope identifier that identifies a particular scope associated with a stage during which the first supply is needed, and wherein to subsequently determine that no subsystem requires the first supply, the processor device is further to subsequently determine that the constraint satisfaction solver has moved to a stage that has a scope that is different from the particular scope.

12. The computing device of claim 9 wherein the processor device is further to:
in response to receiving the first request for the first supply, increment a first supply counter;
subsequently receive, from the first subsystem, an indication that the first subsystem no longer needs the first supply;
decrement the first supply counter; and
wherein to subsequently determine that no subsystem requires the first supply, the processor device is further to determine that the first supply counter indicates that no subsystem is using the first supply.

13. The computing device of claim 9 wherein the processor device is further to:
receive, from the first subsystem, an indication that the first subsystem no longer needs a second supply;
decrement a second supply counter;
determine that the second supply counter indicates that another subsystem is continuing to use the second supply; and
not disable the second supply to allow the second supply to continue to operate.

14. The computing device of claim 9 wherein the processor device is further to:

receive, from a second subsystem a request for a second supply that is different from the first supply, the request including a scope identifier that identifies a scope of a stage during which the second subsystem needs the second supply;

determine that the second supply exists;

determine that the second supply has an associated scope that is narrower than the scope of the stage during which the second subsystem needs the second supply;

set the associated scope of the second supply to the scope of the stage during which the second subsystem needs the second supply; and provide to the second subsystem a supply reference that refers to the second supply that allows the second subsystem to request data directly from the second supply.

15. The computing device of claim 9 wherein the processor device is further to:

receive, from a second subsystem a request for a second supply that is different from the first supply, the request including a scope identifier that identifies a scope of a stage during which the second subsystem needs the second supply;

determine that the second supply exists;

determine that the second supply has an associated scope that is wider than the scope of the stage during which the second subsystem needs the second supply; and provide to the second subsystem a supply reference that refers to the second supply that allows the second subsystem to request data directly from the second supply.

16. A computer program product stored on a non-transitory computer-readable storage medium and including instructions to cause a processor device to:

receive, from a first subsystem, a first request for a first supply, wherein the first subsystem implements a function to facilitate a determination by a constraint satisfaction solver of a recommended solution state from a plurality of solution states of a constraint problem, the constraint satisfaction solver executing in a plurality of stages;

determine that the first supply is not executing;

initiate the first supply, the first supply to return supply data upon request;

provide to the first subsystem a supply reference that refers to the first supply that allows the first subsystem to request the supply data directly from the first supply;

subsequently determine that no subsystem requires the first supply; and disable the first supply, wherein the constraint satisfaction solver continues to execute after the disabling of the first supply.

17. The computer program product of claim 16 wherein the first request for the first supply includes a scope identifier that identifies a particular scope associated with a stage during which the first supply is needed, and wherein to subsequently determine that no subsystem requires the first supply, the instructions further cause the processor device to subsequently determine that the constraint satisfaction solver has moved to a stage that has a scope that is different from the particular scope.

18. The computer program product of claim 16 wherein the instructions further cause the processor device to:

in response to receiving the first request for the first supply, increment a first supply counter;

subsequently receive, from the first subsystem, an indication that the first subsystem no longer needs the first supply;

decrement the first supply counter; and wherein to subsequently determine that no subsystem requires the first supply, the instructions further cause the processor device to determine that the first supply counter indicates that no subsystem is using the first supply.

19. The computer program product of claim 16 wherein the instructions further cause the processor device to:

receive, from the first subsystem, an indication that the first subsystem no longer needs a second supply;

decrement a second supply counter;

determine that the second supply counter indicates that another subsystem is continuing to use the second supply; and not disable the second supply to allow the second supply to continue to operate.

* * * * *